United States Patent [19]

Wood

[11] 4,213,094
[45] Jul. 15, 1980

[54] POLY-PHASE MODULATION SYSTEMS
[75] Inventor: Wilhelm A. H. Wood, Walpole, Mass.
[73] Assignee: Raytheon Company, Lexington, Mass.
[21] Appl. No.: 924,115
[22] Filed: Jul. 13, 1978
[51] Int. Cl.$^2$ ............................................. H04L 27/20
[52] U.S. Cl. ...................................... 370/12; 332/21; 370/11
[58] Field of Search ............... 325/163; 178/66 A, 67; 179/15 BW, 15 BM; 332/10, 21

[56] References Cited

U.S. PATENT DOCUMENTS

| | | | |
|---|---|---|---|
| 3,553,368 | 1/1971 | Rudolph | 325/163 |
| 3,706,945 | 12/1972 | Yanagidaira et al. | 325/163 |
| 3,983,485 | 9/1976 | Stuart | 325/163 |

*Primary Examiner*—Douglas W. Olms
*Attorney, Agent, or Firm*—M. D. Bartlett; J. D. Pannone; H. W. Arnold

[57] ABSTRACT

A modulation system for use in generating a multiphase carrier for digital communication systems which avoids phase and amplitude errors due to temperature and voltage variations inherent in balanced mixers, when used as phase modulators. In this invention, resistive divider networks are used to generate the output vector array. Each output vector thus, has an independent resistive adjustment which has no effect on the other vectors to provide individual and separately aligned phase vectors which are selected for transmission by an addressable multiplexer to provide a phase modulated carrier representing multiplex input data.

14 Claims, 5 Drawing Figures

FIG. 3
TRANSMITTER

POLY-PHASE MODULATION SYSTEMS

BACKGROUND OF THE INVENTION

This invention relates to modulation systems and more particularly to modulation systems in which the phase shift keying of vectors is used for the transmission of data.

Conventional polyphase modulating circuits employing balanced mixers as the phase change element usually consist of input and output transformers cross-coupled by the usual diode quad arrangement using four diodes which change the phase of the input carrier to produce the output vector at 180° or 0° depending upon polarity of the data signal applied to the diodes. This represents one pair of output vectors. When a plurality of vectors are required such as in the transmission of data in which, for example, eight vectors are required to transmit three parallel data bits or streams, additional balanced mixers are required for each pair of vectors transmitted. Such conventional polyphase modulating circuits employing balanced mixers as the phase change element rely on perfect balance of all the phase change elements to achieve exact 180° changes in output for each mixer. In practice, the best that is usually realized is in the order of one degree phase accuracy. This is due to imperfect balance between individual diodes of the diode quad arrangement and transformer imbalance. This leads to a phase error in one of the vector pairs which is not adjustable and which results in system performance degradation. For example, in polyphase devices such as an eight-phase modulator which generates eight independent modulation vectors, additional mixers must be used as amplitude modulators to derive the conventional two-level four-phase vectors that ultimately produce the required eight vector states. These mixers are very sensitive to bias current fluctuation due to temperature or supply voltage variations, when used in a quasi-linear amplitude control mode. The eight vectors when derived in this way, from a two-level four-phase arrangement, or by way of orthogonal amplitude modulators, do not have a primary adjustment feature and alignment of the eight vector states becomes a complex iterative adjustment with all vectors interrelated; that is, when one vector is adjusted for correct phase and amplitude, for example by diode bias current control, the adjusted vector changes the adjustment of other vectors often resulting in a phase error of as much as one or two degrees. At high bit rates of the input data stream, for example three bits per Hertz of the channel bandwidth, such errors become unacceptable within a given channel bandwidth. That is, the narrower the channel bandwidth, the more critical the phase accuracy of individual transmitted vectors become. Such phase error results in unequal angular separation between associated vector pairs and produces phase distortion resulting in system errors in the phase detection process of associated receiving equipment.

SUMMARY OF THE INVENTION

It is, therefore, an important object of the invention to provide that each vector within the phase modulator system be capable of being adjusted independently with substantially no affect on the others.

It is a further object of the invention to provide an improved modulator system in which inherent errors in the output vectors can be adjusted and, unlike the usual balanced mixer approach, each vector can be set exactly and independently.

It is a further object of the invention to provide an improved phase modulator providing a plurality of individual vectors capable of adjustment independently of each other.

In accordance with the invention, a phase modulator comprising a pair of phase splitting amplifiers fed by a carrier oscillator, the input to one amplifier being delayed by 90°, to provide on seperate output buses, signals representing, for example, four quadrature reference vectors 90° apart. Each output signal is generated by a resistive divider connected from one of the four quadrature reference vector lines to an adjacent reference vector line to produce an individual output signal representing the vector having a phase depending on the setting of the value of the individual resistor within the network, the phase of each signal being individually capable of adjustment without affecting the adjustment of the other signals. The output derived from each individual resistive divider forms a network, the outputs of which are coupled to the parallel input gates of a well-known digital multiplexer arrangement which uses parallel input data streams to select the appropriate output signal, representing the individual vector, in accordance with the bit content of the data inputs. In this way the transmitted carrier phase is changed by the input data which can then be phase detected and decoded by a receiver. In this embodiment, the multiplexer MUX, is fed at an intermediate frequency, for example, 70 MHz with the independent signals each provided with a phase adjustment.

In a particular embodiment of the invention each of the reference lines or buses has a pair of potentiometers or resistive dividers connected to an adjacent reference bus, the output tap of each resistive divider being coupled to the input of the digital multiplexer to drive the associated gate to provide successive outputs of a different phase depending upon the bit combination of, for example, three input data streams forming the multiplexer input address. In this manner, the multiplexer selects or commutates in a serial fashion the correctly phased vector for transmission. The output of the multiplexer therefore transmits the particular vector selected by the corresponding input data. By adjusting each potentiometer resistance, precise setting of the phase of the transmitted vector is obtained without affecting the other vectors. In this embodiment it should be understood that a pair of resistive dividers are connected across each of the four quadrature buses to provide eight individually adjusted output signals which are fed to corresponding inputs of the digital multiplexer. While this individual arrangement provides eight signal vectors with 45° separation, commonly referred to as an eight phase modem, additional dividers connected in parallel across reference lines form a divider network which provides a plurality of evenly divided signal vectors such as, for example, sixteen or thirty two-phase modems in which the angular separation is correspondingly smaller.

In its broader aspect, the invention provides the recognition that a plurality of signals each being derived by a resistive divider network coupled to the quadrature reference output buses of a pair of phase splitting amplifiers and fed to corresponding parallel inputs of a digital multiplexer provides precise adjustment for each serially transmitted vector without affecting the other vectors. The invention also provides a simple approach to a multi-level modulation and a single semiconductor chip can be used as the digital multiplexer for up to eight phases and three levels of modulation, representing the combination of the three parallel data inputs. Additional semiconductor chips can be used to transmit additional numbers of vectors and modulation levels. The eight inputs can be used for any vector arrangement, simply by interchanging pairs of inputs to the multiplexer. Thus, the arrangement can be made to follow any binary coding sequence, such as a Gray code, for example.

BRIEF DESCRIPTION OF THE DRAWINGS

For a more complete understanding of the invention, reference is now made to the following description of the accompanying drawings, wherein.

DESCRIPTION OF THE PREFERRED EMBODIMENT

Figure 1:
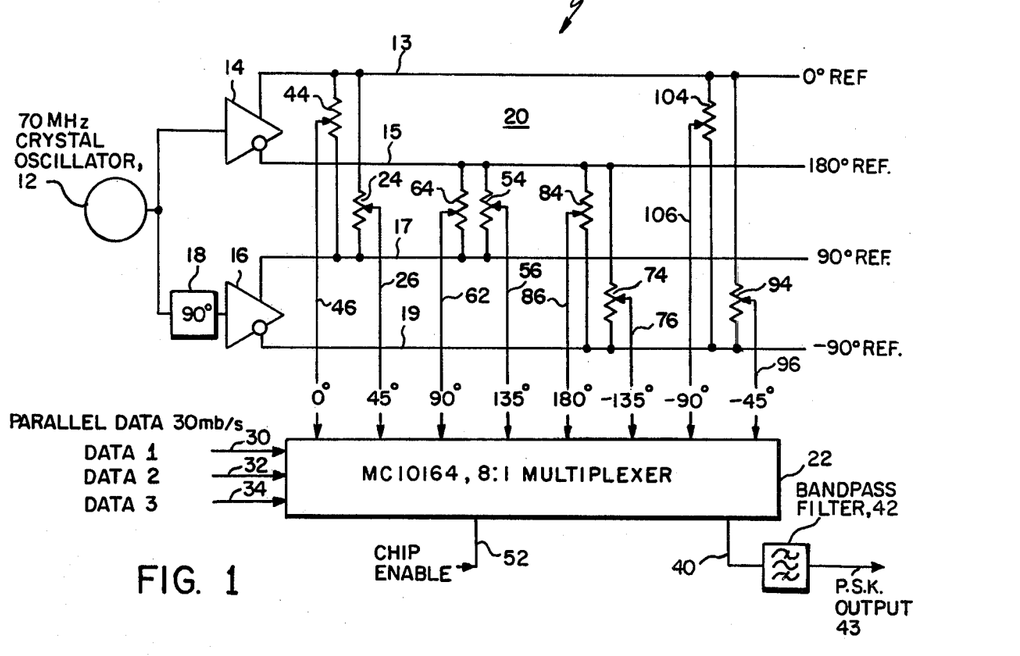
FIG. 1 is a block diagram showing the manner in which signals are generated and phase adjusted by the resistive network for use with a digital multiplexer.

Referring to FIG. 1, there is shown a phase modulator system 10 having a 70 MHz crystal oscillator 12 feeding a pair of conventional phase splitting amplifiers 14 and 16 by way of a well-known 90° phase shift element 18, such as a lumped element delay line to provide a precise 90° phase shift. The phase splitting amplifiers 14 and 16 each provide complimentary outputs or reference signals 180° apart on reference buses 13, 15, 17 and 19, respectively, providing a total of four reference buses or lines having quadrature phase relationships. The phase splitting elements are well-known emitter coupled logic line receivers, such as Motorola Model MC 10116. The phase shift element 18 imparts a phase shift of 90° to one output of the oscillator 12 and provides a signal at the input to phase splitting amplifier 16 which is in phase quadrature to the signal applied to the input of phase splitting amplifier 14.

In accordance with the invention, there is provided a resistive divider network 20 containing individual tapped resistances from the quadrature output buses. The output taps of the resistances are connected to corresponding inputs of a well-known multiplexer 22, such as a Motorola Model MC 10164, which accepts the eight output signals at the taps representing the individual vectors which have been generated by the resistive networks. The data is thus transmitted by selecting the appropriate vector input from the resistive divider output. In particular, each pair of resistive dividers is connected between adjacent quadrature reference buses. For example, resistive divider 24 is connected between 0° reference bus 13 and 90° reference bus 17 to provide a tapped output on lead 26 the phase of which can be independently adjusted to 45° and applied to the corresponding input of the eight input digital multiplexer 22.

For example, at the midpoint of the resistive divider a signal is produced having a phase of 45° which is the midpoint between 0° and 90°. With the correct code on parallel input data lines 30, 32, and 34 the signal representing 45° is transmitted through the eight input multiplexer 22 and appears on its output line 40. Conventional bandpass filter 42 permits only the desired fundamental frequencies of the multiplexer output spectrum to be transmitted on output lead 43. When it is desired to correct the 45° phase, due to inaccurate phase splitting, for example, the tap on resistive divider 24 can be adjusted to precisely 45° using a well-known vector voltmeter which compares the phase on lead 43 with the reference phase of crystal oscillator 12. Due to the low impedance output of approximately 30 ohms of the phase splitting amplifiers 14 and 16 and the relatively high impedance of approximately 1,000 ohms of the resistive divider 24, this adjustment of the 45° output has substantially no effect on the setting of the other dividers. In like manner, the signal having 0° phase is generated by resistive divider 44 and appears on line 46 at the 0° phase input of digital multiplexer 22. It can be seen that resistive dividers 24 and 44 are connected across the same pair of quadrature reference buses 13 and 17 and produce two vectors 45° apart as will be described with reference to FIG. 2.

Divider resistors 54 and 64 are adjusted to provide output signals of 135° and 90° on leads 56 and 62, respectively, each vector being selected by different data codes on the parallel data inputs 30, 32, and 34. Resistive dividers 74 and 84 provide output signals on lines 76 and 86 having phases of −135° and 180°, respectively, inasmuch as these dividers are connected across reference buses 15 and 19 having reference phase signals of 180° and −90° respectively. Finally, resistive dividers 94 and 104 are connected between 0° reference bus 13 and −90° reference bus 19 to provide outputs having a phase of −45° on lead 96 and a phase of −90° on lead 106. It should be understood, as will be described in FIG. 2, the −90° reference bus or lead 19 is one of the quadrature reference phases at the output of phase splitting amplifier 16 while the −90° output signal on lead 106 is in fact selected to be 22.5° away from the adjacent reference vector. Since the output signals in an eight-phase modulator are equally spaced at 45° apart, in order to have the same amplitude, they are all positioned with 22.5° spacing from their adjacent reference vectors. The resistive divider outputs are thereby adjusted to be on the locus of points described by a circle as seen by the arrowheads of FIG. 2 in which all output vectors have the same amplitude without additional amplitude adjustment to eliminate amplitude variances between the transmitted vectors which would result in the addition of undesirable amplitude modulation.

Figure 2:
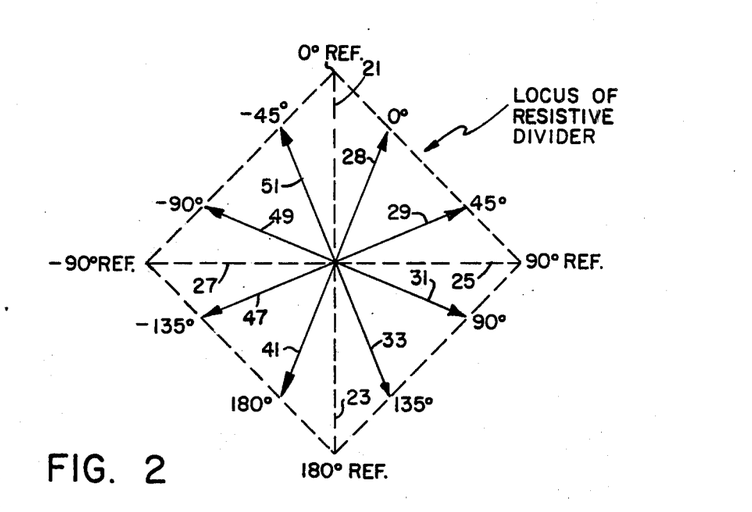
FIG. 2 is a vector diagram showing two vectors in each quadrant, each vector capable of being adjusted independently with no affect on the others.

Referring now to FIG. 1 and in particular to FIG. 2 there is shown a vector diagram showing the relationship of quadrature reference vectors 21, 23, 25, and 27. These reference vectors represent the phase of signals appearing on reference buses 13, 15, 17, and 19 from which a plurality of vectors having adjustable phase are produced, as shown herein, by a pair of resistive dividers connected between adjacent reference leads, the outputs of which form a plurality of equal amplitude vectors each adjusted to be separated by 45° from its adjacent output vector. These output vectors, since they are equal in amplitude can be seen to lie on the points of a circle. Also, as the resistive divider 44 is adjusted to its uppermost position with respect to reference bus 13, the 0° output vector 28 would lie on the 0° reference vector 21, and as its resistance is increased the 0° output vector 28 rotates along the locus of the resistive divider to lie along the 90° reference vector 25. The output of resistive divider 44 representing the 0° vector 28 is adjusted to be 22.5° away from the 0° reference vector 21 and connected to the first input of the digital multiplexer 22. In like manner, it can be seen that resistive divider 24 is adjusted to produce output vector 29 at 45° from the 0° output vector 28 which is 22.5° from the 90° reference vector or quadrant line 25. Its output is connected by way of lead 26 to a second input of the digital multiplexer 22.

Resistive dividers 24 and 44 produce two vectors 28 and 29 that lie within the 0° and 90° first quadrant of the reference vector diagram. Multilevel phase shift key (PSK) modulation of the digital multiplexer 22 is provided in response to the data on the three parallel inputs 30, 32, and 34. These vectors are equally spaced at 45° in the embodiment of this eight-phase modulator 10. Thus, 90° output vector 31 is also 45° from the 135° output vector 33. These vectors are produced by resistive dividers 64 and 54, respectively, and are adjusted to be equally spaced from the remaining vectors. They are connected via leads 62 and 56 to the respective third and fourth inputs of the digital multiplexer 22. In like manner resistive dividers 84 and 74 produce the 180° output vector 41 and the −135° output vector 47, respectively, in the third quadrant of the reference vector diagram of FIG. 2. Leads 86 and 76 connect the signals represented by vectors 41 and 47, respectively, to the fifth and sixth inputs of the digital multiplexer 22. Resistive dividers 104 and 94 produce vector 49 having a −90° phase and vector 51 having a −45° phase, respectively, which are connected by way of leads 106 and 96 to the seventh and eighth input of the eight phase digital multiplexer 22. The phase of the eight inputs to the multiplexers are equally spaced at 45° to provide maximum separation to provide optimum phase detection in a receiving system.

While four pairs of resistive dividers have been shown to generate the eight-phase output signal in response to the three parallel data inputs required in multilevel binary modulation system, it should be understood that additional pairs of resistive dividers, for example, four resistive dividers across reference vector pairs for a sixteen phase modulation system, can be added. The phase separation of the sixteen vectors is thus 22.5°. The total number of vectors need not be a binary number, for example, three resistive dividers for each reference quadrant can be used in conjunction with a twelve input multiplexer having four parallel data inputs to provide a twelve phase modulation system. In this case, instead of three parallel 30 megabits per second, Mb/s, data inputs as derived from a serial to parallel converter from a 90 Mb/s data source, not shown, the twelve phase modulation system uses four parallel data inputs each of which is at a rate of 22.5 Mb/s. In addition, an output blanking signal applied to line 52, commonly referred to as a "chip enable," can be used to transmit a zero output state at selected intervals determined by the coding of the data at the parallel inputs to the digital multiplexer. For example, the presence of all "ones" at the data inputs can be detected and used to produce a signal at lead 52 that adds a zero state to the vector diagram by turning off the multiplexer. Thus, the eight-phase modulator can be converted to a system transmitting seven phase vectors and one zero amplitude state.

In operation, therefore, the three parallel data lines 30, 32, and 34 carrying encoded data representing time division multiplexer telephone or information channels, are used to phase modulate the carrier signals produced by crystal oscillator 12. The sequential selection of the precisely adjusted input vector by the parallel input data can be made to follow a code, such as Gray code, as described in chapter 4 of the "Theory of Synchronous Communications" by J. Stiffler, published by Prentice Hall in 1971. By arrangement of the input connection and the gating arrangements within the digital multiplexer, not shown, the transmitted output vectors follow a Gray code. The phase shift key, PSK, output spectrum of the digital multiplexer when modulated by random data is described by the expression $(\sin x /x)^2$.

The well-known digital multiplexer such as Motorola model number MC 10164 has a operating speed which permits modulation of the vectors, generated from the 70 MHz carrier, by the 30 Mb/s parallel input data. Bandpass filter 42 removes the unwanted side lobes of the output spectrum so that only the main lobe of the output spectrum is presented for subsequent transmission. While eight phase states are shown in the present embodiment, a greater number of phase states can be transmitted by providing a greater number of vectors by using additional resistive dividers adjusted to provide equal phase separation of the vectors as described in connection with FIG. 2.

Figure 3:
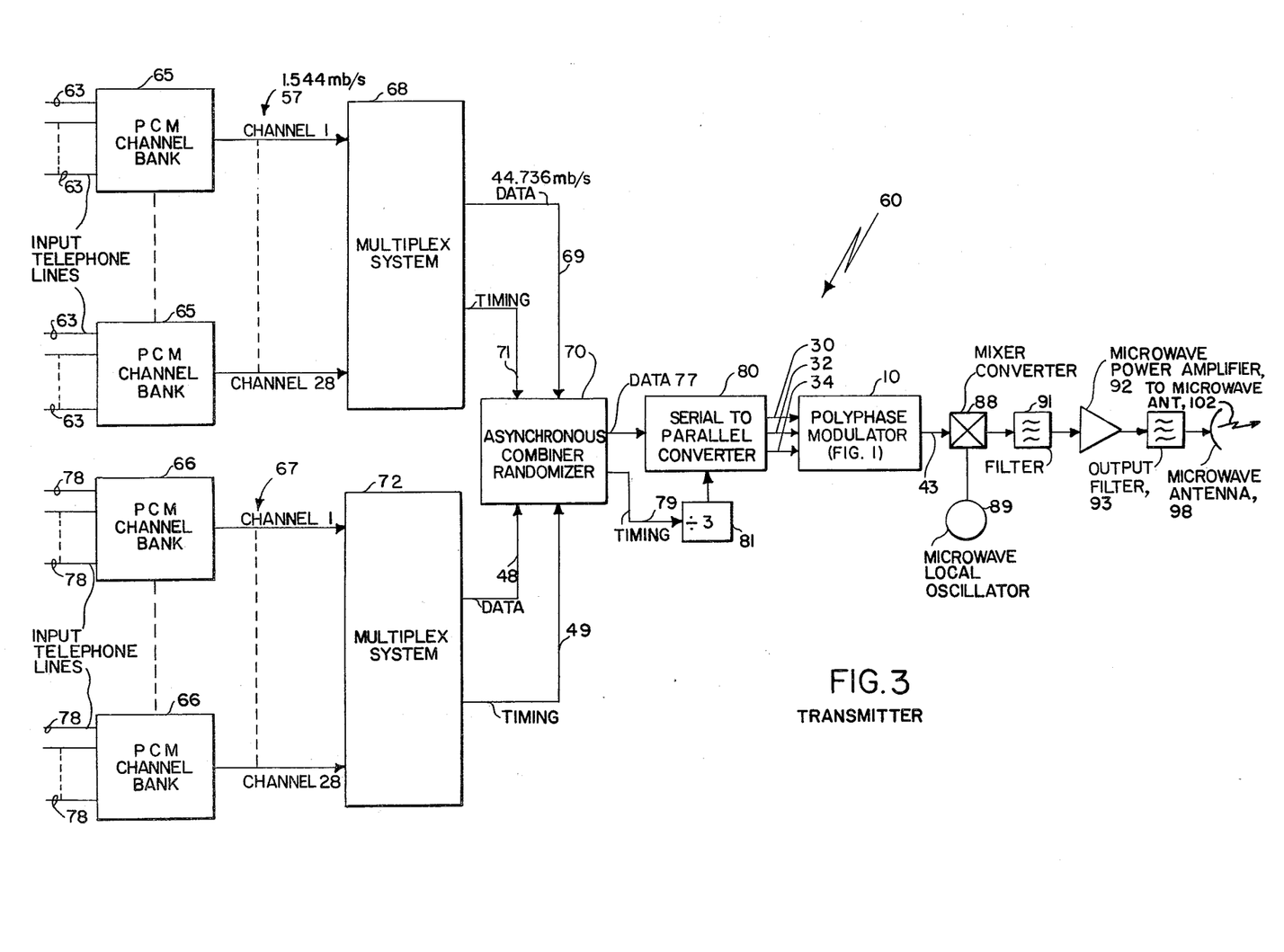
FIG. 3 is a block diagram of a transmitting system employing the polyphase modulator.

Referring now to FIG. 3, there is shown a system 60, which in accordance with the invention, provides for the transmission of phase modulated signals representing data from 56 PCM, pulse code modulation, channel banks, the first such PCM channel bank 65 each having twenty-four voice channel inputs 63. The first channel is seen to comprise, by way of example, a plurality of telephone lines 63 which are coupled to a well-known PCM, pulse code modulation channel bank or converter 65, such as a Western Electric T1 channel bank, the operation of which is described in Chapter 10 of the aforementioned Stiffler reference. Twenty-eight such channel banks 65, having data outputs at 1.544 Mb/s, are fed to a conventional multiplexer 68. The multiplexer 68 comprises well-known sampling circuitry which sequentially samples the signals of the individual channel bank output lines and interleaves the samples in a predetermined order to provide serial data on a single line 69 at the established DS-3 rate of 44.736 megabits per second, timing information for this data being carried on line 71. The signal on line 69 is then fed to a conventional asynchronous combiner 70 together with timing channel 71, which provides a combined data output signal at 90 megabits per second when combined with multiplexed signals from the second channel multiplexer 72. In this manner, an additional 44.736 Mb/s channel is added thus permitting data on a maximum of 1,344 telephone lines (24 lines times 28 channel banks times 2 multiplexers) to be transmitted over the digital microwave link. A feature of the invention is that the accuracy of adjustment of vectors results in less performance degradation for transmission over an established RF channel bandwidth. Accordingly, data transmission is less affected by phase and amplitude distortion both from within the equipment as well as that produced during conditions of atmospheric fading.

The asynchronous combiner 70 mixes the data of the second channel from multiplexer 72 by way of data line 48 with the 44.736 megabits per second data on line 69 from multiplexer 68 and provides the 90 megabits per second signal on line 77. This signal is fed to the polyphase modulator 10 by way of a conventional serial-to-parallel converter 80, the timing being provided by way of line 79 to a divide-by-three counter 81 to provide three 30 Mb/s inputs to the digital multiplexer in the polyphase modulator 10. It should be understood that a well-known synchronous combiner can be used to combine the data from the first and second multiplexer by bit interleaving to provide the 90 Mb/s data on line 77. However, in this embodiment synchronization of the two data streams is not required since an asynchronous combiner 70 comprising a synchronous combiner is used in conjunction with well-known pulse stuffing or elastic store circuit techniques in which the two data stream are synchronized by the addition or deletion of a pulse at the appropriate time interval. This is seen on page 904 of the Bell System Technical Journal, Vol. 54, No. 5 of May-June 1975 published by the American Telephone and Telegraph Company.

The second channel is seen to comprise, by way of example, a second multiplexer 72 fed by a second set of twenty-four telephone lines 78 by way of a second set of twenty-eight channel banks 66. The second multiplexer 72 provides data and timing outputs that are fed via data line 48 and timing line 49 to the asynchronous combiner 70. The combiner provides a combined data output signal at 90 Mb/s that is obtained by interleaving bits from multiplexers 68 and 72. The multiplexer 72 operates in a manner similar to multiplexer 68 and includes well-known circuitry, for serially multiplexing the data signals on lines 57 and 67 to digital signals at a 44.736 megabits per second rate on lines 69 and 48. The combined 90 Mb/s signal on data line 77 of FIG. 3 is applied to polyphase modulator 10 together with the timing on line 79. The data on line 77 is divided into three separate 30 megabits per second signal streams by a conventional serial-to-parallel converter 80. The timing on line 79 is divided by three using a well-known divider 81. The output of this divider is used to synchronize the three parallel data output lines 30, 32, and 34 which were previously seen in FIG. 1. The 30 Mb/s parallel data selects the appropriate vector from the novel resistive divider network that is connected to the four quadrature reference buses as described in FIG. 1. The filtered output signal on line 43 of the quadrature polyphase modulator 10 of FIG. 1 is then fed to a well-known converter 88 which mixes the output signal with the output of microwave local oscillator 89 to provide a modulated microwave carrier output of approximately 6 Gigahertz which contains the vector information corresponding to the data in the three parallel 30 Mb/s data streams. The output of mixer 88 is coupled to a conventional wideband microwave amplifier 92 via bandpass filter 91 which removes undesirable local oscillator components. A second bandpass filter 93 removes undesirable spectrum outputs from reaching the antenna 98 while permitting the desirable output to be transmitted. The output of filter 93 is coupled to a microwave antenna 98 to transmit to a receiving system, a 6 Ghz carrier signal that is phase shift modulated by the data. The receiving system for translating this data will be described.

Figure 4:
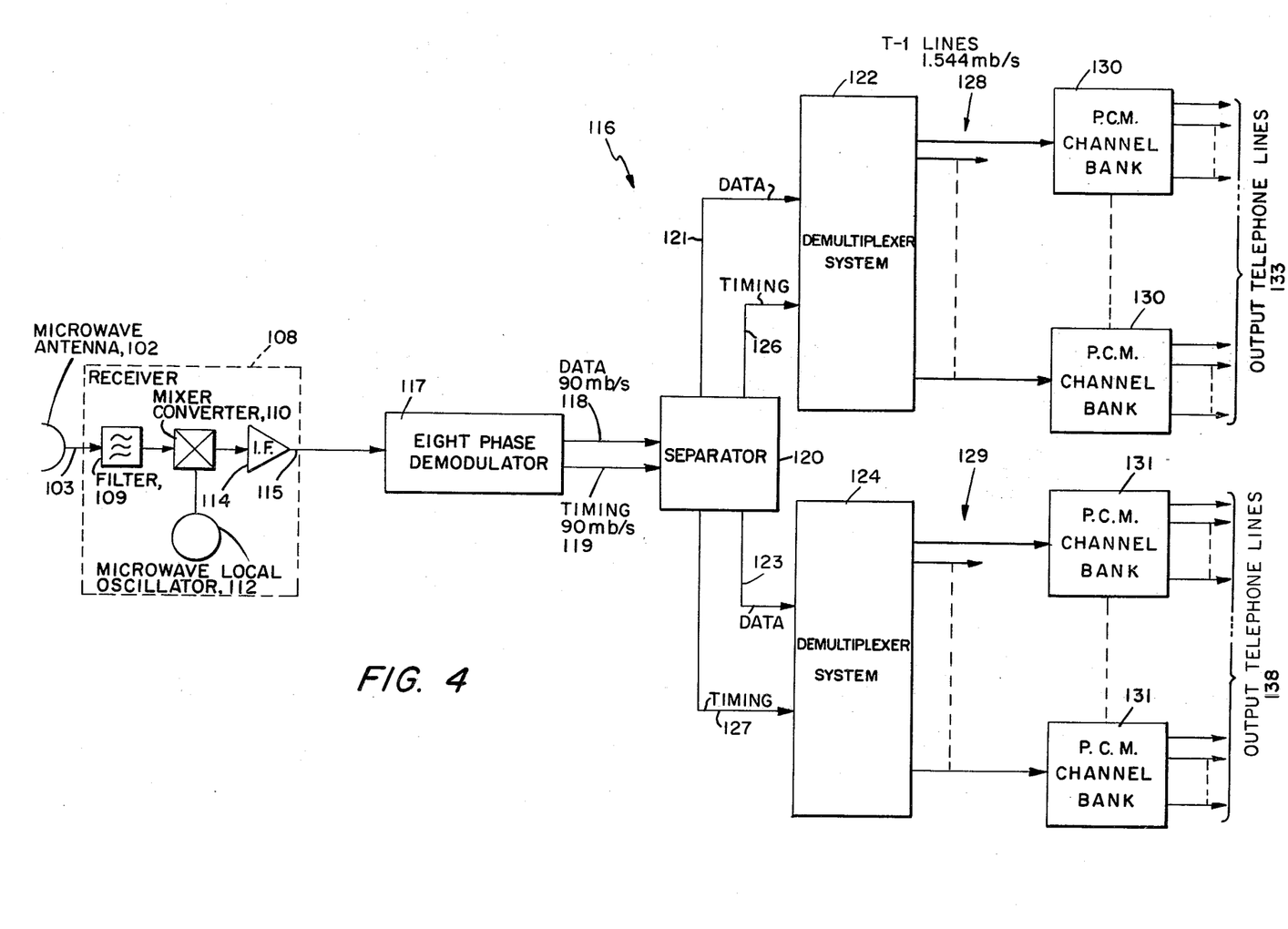
FIG. 4 is a block diagram of a receiving system which demodulates the transmitted data.

Referring to FIG. 4 in conjunction with FIG. 3, the signal from microwave antenna 98 of FIG. 3 is typically coupled via a wireless transmission path, not shown, which arrives at a receiving antenna 102 which is coupled via line 103 to a conventional microwave receivier 108. The receiver 108 comprises a waveguide filter 109 for removing unwanted signals having frequencies outside the receiver band of operation which would otherwise interfere with the signal to be received.

Filter 109 is connected to a conventional mixer or converter 110 which mixes the output of microwave local oscillator 112 to heterodyne the microwave carrier signal and translate it to an intermediate frequency signal which is connected to the input of a conventional IF amplifier 114 having well-known automatic gain control circuits. The output of IF amplifier 114 is coupled via line 115 to a signal processor 116 in the form of an eight-phase demodulator 117 which will be described in detail. The eight phase demodulator 117 coherently recovers the intermediate frequency carrier and timing information. The coherent carrier is then used to recover the 90 Mb/s data signal, the timing information is used to re-time the output data that is fed to a conventional asynchronous separator 120. The separator splits the 90 Mb/s data on line 118 in connection with timing line 119 into two separate de-multiplexed 44.736 Mb/s data streams which are connected to de-multiplexer 122 and de-multiplexer 124 by way of data lines 121 and 123, respectively. The timing information for these multiplexers is carried on lines 126 and 127, respectively. Asynchronous separator 120 separates the two previously combined interleaved data streams to provide the two 44.736 Mb/s data streams on lines 121 and 123. In this embodiment, the asynchronous separator comprises a well-known synchronous separator used in conjunction with a well-known pulse de-stuffing or elastic store technique as described on page 904 of the aforementioned Bell Systems Technical Journal. The pulses previously added by the asynchronous combiner 70 of FIG. 3 are now removed by well-known pulse deletion or de-stuffing techniques. The separated data applied to de-multiplexer 122 and 124 from asynchronous separator 120 is now demultiplexed in a well-known manner to provide at each de-multiplexer output a set of twenty-eight 1.544 Mb/s data lines 128 and 129 corresponding to the T1 digital data lines 57 and 67 of FIG. 3. To convert the 1.544 Mb/s data back to the original twenty-four telephone lines 63 of FIG. 3, the corresponding PCM channel bank receivers 130 and 131 are used which, for example, comprise serial shift registers having parallel output paths for each of the twenty-four voice channels, the data from which channel undergoes digital-to-analog conversion by well-known pulse code de-modulation, not shown. A description of the operation of which is seen at page 293, chapter 10 of the aforementioned Stiffler reference.

A typical channel bank is also described, for example, with reference to FIGS. 5 and 6 of the manual for T324 PCM "Carrier System" ITT R series published by the International Telephone and Telegraph Corporation in 1973. The outputs of both sets of twenty-eight PCM channel banks 130 and 131 provide a total of 1,344 voice frequency signals shown in sets of twenty-four telephone lines 133 and 138 for each of the channel banks 130 and 131, respectively. This completes the transmission and translation of the telephone inputs of lines 63 and 78 of FIG. 3 into corresponding voice frequency signals on output telephone lines 133 and 138 of FIG. 4.

Figure 5:
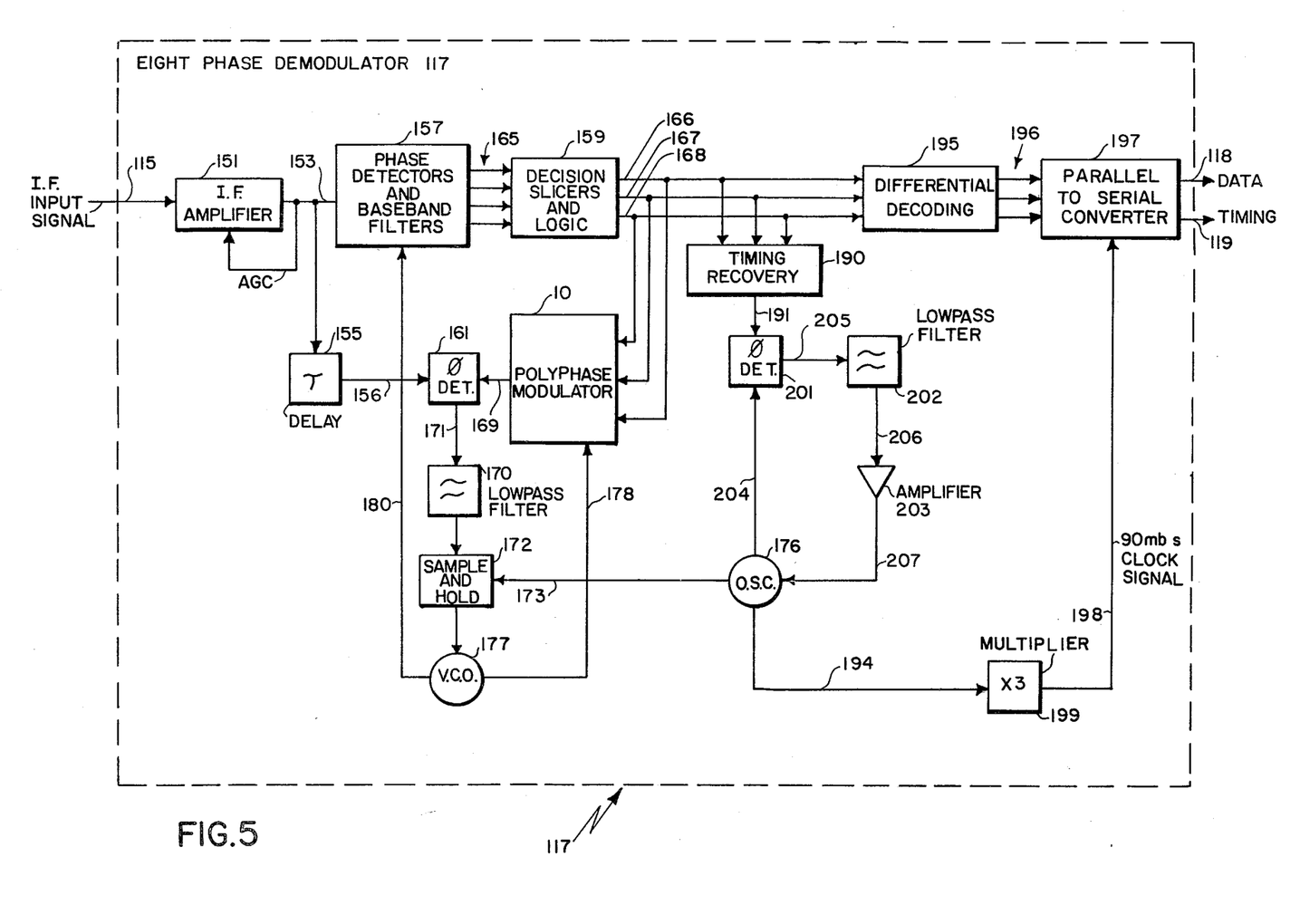
FIG. 5 is a block diagram of an eight-phase demodulator which includes the polyphase modulator of FIG. 1 further describing inverse modulation for recovery of data and coherent received carrier from the input signal.

Referring now to FIG. 5, in conjunction with FIG. 4, there is seen a block diagram of the eight-phase demodulator 117 of the receiver of FIG. 4. The eight-phase de-modulator comprises a polyphase modulator 10 in a conventional phase lock loop operating as an inverse modulator coherently to recover the intermediate frequency carrier and the original 90 Mb/s data signal. To recover the timing signal for this process, a second phase lock loop which includes a phase detector, low pass filter and a phase detector are used. After differential decoding, and parallel-to-serial conversion, this recovered timing signal is used to re-time the output 90 Mb/s data on line 118.

The output of the de-modulator on data line 118 and timing line 119 is the 90 Mb/s signal which is coupled to the data separator 120 of FIG. 4 for the production of 44.736 megabits per second data signals on lines 121 and 123 applied to demultiplexers 122 and 124, respectively.

In particular, the IF signal from amplifier 114 of the receiver 108 of FIG. 4 is coupled by line 115 to a conventional IF amplifier 151 having automatic gain control, AGC, to provide a constant input level to the phase detectors of the de-modulator. The amplifier output signal on line 153 drives a conventional coaxial delay line 155. This provides a delay time that is equal to the sum of the delays of phase detector and baseband filters, decision slicers and logic 159 and inverse modulator 10 of FIG. 1, so that signals presented to phase detector 161 bear the same absolute time relationship to provide an output signal representing the phase difference between the output of delay 155 and the output for inverse modulator 10. Amplifier 151 additionally drives the four conventional phase detectors and their corresponding baseband filters 157. The four outputs required to decode the modulated input signal on line 153 appear on line 165 as four parallel 30 Mb/s data signals. Four corresponding decision slicers 159 and emitter coupled logic devices, not shown, are used to convert the four baseband data signals on lines 165, in a well known manner, into the three parallel data lines 166, 167 and 168 at 30 Mb/s which corresponds to the data originally transmitted via lines 30, 32 and 34 of FIG. 1. In this manner the modulation of the IF signal on line 115 of FIG. 4 is recovered for further processing within the de-modulator.

In order to recover the carrier signal in a coherent manner the three outputs of decision slicers 159 such as A to D converters, for example, Motorola MC1650 are used. Also conventional logic gates 159 are used to convert the four phase detector outputs, not shown, into three parallel data inputs of inverse modulator 10. Thus, the polyphase modulator is used in the inverse manner to locally generate eight vector positions of the signal on line 169 which corresponds to the output line 43 of bandpass filter 42 of FIG. 1. The polyphase modulator operating as an inverse modulator includes the novel resistive divider network which in combination with a multiplexer is adjusted with the aid of a vector voltmeter as previously described with reference to FIG. 1. In this manner it can be seen that the eight individual vectors can be independently adjusted to reproduce the original transmitted vectors and thus accurately synchronize the data in the receiving system to that of the transmitting system. Phase detector 161 provides an output signal on line 171, representing the phase error between the inverse modulator output and the delayed IF signal on line 156. The differential output on line 171 is low pass filtered by filter 170 which removes the unwanted high frequency components and passes the wanted phase error signal to sample and hold circuitry 172. This conventional circuit samples the signal at the correct time as determined by the divide-by-three clock signal on line 173 from voltage controlled crystal oscillator 176 in a manner to be described. The divide-by-three clock signal gates the sample and hold circuit at the correct time to transmit the differential error signal to vary carrier oscillator 177 to complete a phase lock loop by way of line 178 and provide a phase locked reference signal by way of line 180. This phase locked carrier reference signal is then fed progressively via 45° delay networks, not shown, to the four phase detectors 157, to act as individual reference signals to decode the eight possible phase positions of the input signal on line 153. The implementation of the polyphase modulator when used in either transmitter or receiver or in both permits higher spectral or packing density expressed in bits per Hertz for a single Hertz of fixed available bandwidth.

Referring again to FIG. 5 timing recovery of the eight phase de-modulator 117 is generated in a conventional ½ bit delay and compare timing recovery circuit comprising for each input line an "exclusive OR circuit," one input of each being delayed by one-half of a data bit interval. The delayed input combines with the data input to initiate the "exclusive OR circuit" to provide a single clock pulse for each data transmission. In this manner and by resistively combining the outputs of three such timing signals, a continuous timing output appears on line 191. The three data lines 166, 167, and 168 are connected to a differential decoding circuit 195 in which the present three data bits are compared with the previous three data bits and the decoded difference signals representing decoded data are presented on lines 196. A detailed description of this well-known operation is seen at page 372 of the aforementioned Stiffler reference. Decoded outputs on lines 196 are connected to a well-known parallel to serial converter 197, the data output of which is retimed by the 90 Mb/s clock signal on line 198 as determined by the output of oscillator 176 on line 194 and multiplier 199. Serial 90 Mb/s data on line 118 and the timing signal on line 119 are fed to separator 120 of FIG. 4 for separation into two 44.736 Mb/s data signals as previously described. The timing output on line 194 from voltage controlled crystal oscillator 176 is determined by a phase locked loop comprising conventional phase detector 201, low pass filter 202 and a conventional DC error amplifier 203. Oscillator 176 provides three isolated outputs on lines 173, 194, and 204 the latter output being compared in phase detector 201 with the recovered timing signal on line 191 to provide an error signal on line 205. Thus, oscillator 176 is phase locked to the recovered timing signal present on line 191. The phase detector output error signal on line 205 is filtered by low pass filter 202 which removes unwanted high frequency components while permitting the desired DC error signal on line 206 to be amplified by amplifier 203. The output of amplifier 203 on line 207 is coupled by way of a a conventional varactor diode, not shown, to vary the oscillator to maintain phase coherence with the recovered timing signal on line 191. This timing recovery phase locked loop thus removes timing jitter and noise resulting from the transmission process. For example, fading and limited channel bandwidth contribute to timing and carrier jitter which, when removed, restores the data to its originally transmitted form. Thus, by use of the novel polyphase modulator 10 in both the transmitter of FIG. 3 and the receiver of FIG. 4, accuracy of vector phase alignment beyond that of a balanced mixer and thereby precise system phase alignment is achieved.

It is understood that the above-described embodiments of the invention are illustrative only and that modifications thereof will occur to those skilled in the art. For example, other transmission media, such as, fiber optic cables or wire cable can be used for conveying coherent carrier information from the transmitting means to the receiving means. Accordingly, it is desired that this invention is not to be limited to the embodiments disclosed herein, but is to be limited only as defined by the appended claims.

What is claimed is:

1. A phase modulator used in the generation of a multiphase carrier comprising phase shift means for providing orthogonal pairs of carrier reference signals on pairs of output leads for use as pairs of reference vectors, independent resistive elements coupled to each pair of said output leads to provide at the output of a resistive element a separately adjusted phase vector, and an addressable digital multiplexer coupled to the output of each resistive element to provide a phase modulated carrier representing input data to said digital multiplexer.

2. In combination:
a phase splitting element adapted to provide a plurality of pairs of output signals in phase quadrature on output buses;
a digital multiplexer for selecting parallel data inputs to a serial output; and
a plurality of divider resistors connected from one output bus to another to provide at the output of each divider resistor a signal representing a predetermined phase angle, the output of each divider resistor being connected to an input terminal on said digital multiplexer, whereby the phase angle setting of each divider resistor is made without affecting the phase angle setting of other divider resistors, said digital multiplexer adapted to select for transmission the signal having a predetermined phase angle in response to a coded input data signal.

3. In combination:
a digital multiplexer;
phase splitting elements having a plurality of individual leads having output signals, the phase of pairs of said output signals being derived in phase quadrature;
a resistive divider connected between pairs of said individual leads, the tap of each resistive divider being connected to an input terminal of said digital multiplexer, whereby the setting of said tap determines the relative phase of signals transmitted from said multiplexer in response to input coded data.

4. In combination:
a digital multiplexer;
phase splitting elements having a plurality of individual leads having output signals, the phase of pairs of said output signals being derived in phase quadrature;
a resistive divider connected between pairs of said individual leads, the tap on each resistive divider being connected to an input terminal of said digital multiplexer, whereby the setting of said tap determines the relative phase of signals transmitted from said multiplexer in response to input coded data;
means for transmitting said phase related signals at a predetermined frequency, means for receiving said transmitted signals and converting said received signals to input coded data, said receiving means including a resistive divider network, a second digital multiplexer fed by said resistive divider network in a manner adapted to propagate a phase adjusted signal applied to said second digital multiplexer, whereby the phase of said received signals are adjusted to the phase of said transmitted signals.

5. In combination:
a digital multiplexer;
phase splitting elements producing on individual leads corresponding output signals having quadrature phase relationship;
a plurality of resistive dividers connected from one to another of said individual leads; and
an output tap on each divider connected to an input on said digital multiplexer to transmit a signal having a phase related to input data applied to said digital multiplexer whereby a precise setting of the phase of a transmitted signal is obtained.

6. A system for transmission of phase modulated signals representative of data from a plurality of information channel lines comprising:
means for converting a plurality of information channels to pulse coded signals;
means for sampling said pulse coded signals and interleaving samples in a predetermined order to provide serial data on a single line, means for combining data on said single line with data on a second channel to provide a combined data signal on said single line;
means for connecting said single line signal into a plurality of parallel data signals;
a polyphase modulator including phase splitting means for providing orthogonal pairs of carrier reference signals on corresponding output leads for use as pairs of reference vectors;
independent resistive elements coupled to each pair of said output leads to provide at the output of a resistive element a separately adjusted phase vector; and
an addressable digital muliplexer coupled to the output of each resistive element to provide a phase modulated carrier representing said plurality of parallel data signals applied to said addressable digital multiplexer.

7. A system for transmission of phase modulated signals representative of data from a plurality of information channel lines comprising:
means for converting a plurality of information channels to pulse coded signals;
means for sampling said pulse coded signals and interleaving samples in a predetermined order to provide serial data on a single line;
means for combining data on said single line with data on a second channel to provide a combined data signal on said single line;
means for converting said single line signal into a plurality of parallel data signals;
a polyphase modulator including a digital multiplexer, phase splitting elements having individual leads providing output signals on corresponding leads, the phase of pairs of said output signals being derived in phase quadrature; and
a resistive divider connected between pairs of individual leads, the tap on each resistive divider being connected to an input terminal of said digital multiplexer, the setting of the tap adapted to determine the relative phase of modulated carrier signals transmitted from said digital multiplexer in response to said plurality of parallel data signals applied to the input of said digital multiplexer.

8. A digital communication system having a phase modulator for generating a multiphase carrier comprising:
 means for providing orthogonal pairs of carrier reference signals on pairs of output leads for use as reference vectors, independent resistive elements coupled to each pair of said output leads to provide at the output of a resistive element a separately adjusted phase vector;
 an addressable digital multiplexer coupled to the output of each resistive element to provide a phase modulated carrier representing input data to said digital multiplexer;
 means for transmitting said phase modulated carrier at a predetermined frequency;
 means for receiving said phase modulated carrier;
 said receiving means including polyphase demodulator means to provide a demultiplexed output of a plurality of digital data lines carrying output data corresponding to said input data;
 means for converting said output data to original input data; and
 means for varying each resistive element independently of another, whereby the phase angle setting of each resistive element is made without affecting the phase angle setting of the other resistive elements.

9. A digital communication system having a phase modulator for generating a multiphase carrier comprising:
 multiplexer means for converting parallel information channels to a plurality of channels of pulse coded signals;
 means for providing orthogonal pairs of carrier reference signals derived from a source of oscillation;
 resistive means for adjusting the relative phase angle of individual vectors associated with the pairs of carrier reference signals;
 a digital multiplexer having inputs connected in operative relationship to the adjusted output signals of the resistive means; and
 said digital multiplexer adapted to select in a predetermined sequence a plurality of said pulse coded signals
 to transmit a phase modulated carrier representative of input data to said digital multiplexer.

10. A digital communication system having a phase modulator for generating a muliphase carrier comprising:
 multiplexer means for converting a parallel information channels to a plurality of channels of pulse coded signals;
 means for providing pairs of orthogonal carrier reference signals derived from a source of oscillation;
 resistive means for adjusting the relative phase angle of individual vectors associated with said pairs of carrier reference signals;
 a digital multiplexer having parallel inputs connected in operative relationship to the adjusted output signals of the resistive means;
 said digital multiplexer adapted to select individual vectors in response to a plurality of said pulse coded signals to transmit
 a phase modulated carrier representative of input data to said digital multiplexer; and
 means for transmitting said phase modulated carrier at a predetermined frequency.

11. A digital communication system having a phase modulator for generating a multiphase carrier comprising:
 multiplexer means for converting parallel information channels to a plurality of channels of pulse coded signals;
 means for providing orthogonal pairs of carrier reference signals derived from a source of oscillation;
 resistive means for adjusting the relative phase angle of an output signal derived from the individual vectors associated with the pairs of carrier reference signals;
 a digital multiplexer having parallel inputs connected in operative relationship to the adjusted output signals of the resistive means;
 said digital multiplexer adapted to select for transmission a plurality of said pulse coded signals in a predetermined sequence to provide a phase modulated carrier representative of input data to said digital multiplexer;
 means for transmitting said phase modulated carrier at a predetermined frequency;
 means for receiving said phase modulated carrier at a predetermined frequency, said means including a polyphase demodulator providing a plurality of output signals adapted to be independently adjusted to reproduce the phase angle of carrier signals transmitted by said phase modulated carrier, thereby to synchronize received data on said phase modulated carrier to that of the transmitted data; and
 means to convert said synchronized received data into information signals corresponding to said originally transmitted pulse coded signals.

12. The system of claim 11 wherein:
 said polyphase de-modulator means in said receiving means operates in conjunction with timing means and a phase locked loop, including phase detector means and a carrier oscillator, said phase detector means varying the frequency of said carrier oscillator to maintain phase coherence with said phase modulated carrier.

13. The combination of claim 4 wherein:
 the means for transmitting phase related signals includes a serial-to-parallel converter for providing a plurality of channels of input coded data at the input of said digital multiplexer, an asynchronous combiner adapted to convert the data outputs from a plurality of digital multiplex means to a combined data signal at the input of said serial-to-parallel converter, the input of said multiplex means being coupled to the outputs of a plurality of parallel data channels whereby data is fed to said multiplex means at a lower data rate than the multiplexed output data is fed to said asynchronous combiner.

14. The combination of claim 10 wherein:
 information carried by the parallel information channels is at audio frequencies.

* * * * *